United States Patent
Behmer et al.

(10) Patent No.: US 10,240,578 B2
(45) Date of Patent: Mar. 26, 2019

(54) EROSION RESISTANT AERODYNAMIC FAIRING

(71) Applicant: Blade Dynamics Limited, Southhampton, Hampshire (GB)

(72) Inventors: Harald Behmer, Isle of Wight (GB); Peter Anthony Broome, Isle of Wight (GB); Paul Trevor Hayden, Isle of Wight (GB)

(73) Assignee: BLADE DYNAMICS LIMITED, Hampshire (GB)

(*) Notice: Subject to any disclaimer, the term of this patent is extended or adjusted under 35 U.S.C. 154(b) by 548 days.

(21) Appl. No.: 14/909,193

(22) PCT Filed: Jul. 30, 2014

(86) PCT No.: PCT/GB2014/052337
§ 371 (c)(1),
(2) Date: Feb. 1, 2016

(87) PCT Pub. No.: WO2015/015202
PCT Pub. Date: Feb. 5, 2015

(65) Prior Publication Data
US 2016/0215757 A1    Jul. 28, 2016

(30) Foreign Application Priority Data
Aug. 1, 2013  (GB) .................................. 1313779.9

(51) Int. Cl.
| F03D 1/06 | (2006.01) |
| B29C 70/08 | (2006.01) |
| B29K 63/00 | (2006.01) |
| B29L 31/08 | (2006.01) |
| B29K 105/08 | (2006.01) |

(Continued)

(52) U.S. Cl.
CPC .......... *F03D 1/0675* (2013.01); *B29C 70/086* (2013.01); *B29K 2063/00* (2013.01);
(Continued)

(58) Field of Classification Search
CPC .... F03D 1/0675; B29C 70/086; Y02P 70/523; B29K 2063/00; B29K 2105/089;
(Continued)

(56) References Cited

U.S. PATENT DOCUMENTS

| 2002/0064456 A1* | 5/2002 | Marlin ................... B29C 70/34 |
| | | 415/191 |
| 2006/0027314 A1* | 2/2006 | Jones ..................... B29C 33/10 |
| | | 156/245 |

(Continued)

FOREIGN PATENT DOCUMENTS

| CN | 101128307 A | 2/2008 |
| CN | 201786551 U | 4/2011 |

(Continued)

OTHER PUBLICATIONS

International Search Report and Written Opinion dated Nov. 26, 2014 which was issued in connection with PCT Patent Application No. PCT/GB2014/052337 which was filed on Jul. 30, 2014.

(Continued)

*Primary Examiner* — Richard A Edgar
(74) *Attorney, Agent, or Firm* — GE Global Patent Operation; Douglas D. Zhang

(57) ABSTRACT

An erosion resistant aerodynamic fairing for a rotor blade. A fairing body is formed from at least one reinforcing fiber layer set in a cured resin. An erosion resistant pre-form is fixed to an outer surface of the fairing body. The erosion resistant pre-form comprises a thermoplastic film outer layer fused to a fiber substrate. The fiber substrate of the erosion resistant pre-form is impregnated with the cured resin of the fairing body which fixes at the preform to the fairing body.

21 Claims, 4 Drawing Sheets

(51) Int. Cl.
  *B29K 309/08* (2006.01)
  *B29K 675/00* (2006.01)
(52) U.S. Cl.
  CPC .... *B29K 2105/089* (2013.01); *B29K 2309/08* (2013.01); *B29K 2675/00* (2013.01); *B29L 2031/085* (2013.01); *F05B 2260/95* (2013.01); *F05B 2280/702* (2013.01); *Y02E 10/721* (2013.01); *Y02P 70/523* (2015.11)
(58) Field of Classification Search
  CPC ............ B29K 2309/08; B29K 2675/00; B29L 2031/085; F05B 2260/95; F05B 2280/702; Y02E 10/721
  See application file for complete search history.

(56) References Cited

U.S. PATENT DOCUMENTS

2009/0246033 A1* 10/2009 Rudling .................. B32B 27/30
  416/241 A
2011/0194941 A1* 8/2011 Parkin .................... B29C 70/48
  416/224
2012/0034094 A1 2/2012 Wansink

FOREIGN PATENT DOCUMENTS

| | | |
|---|---|---|
| DE | 102006002198 A1 | 7/2007 |
| EP | 2615304 A1 | 7/2013 |
| GB | 1034738 A | 7/1966 |
| WO | 9523179 A1 | 8/1995 |
| WO | 2006006593 A1 | 1/2006 |
| WO | WO 2010117262 A1 * | 10/2010 ......... B29D 99/0025 |

OTHER PUBLICATIONS

Great Britain Search Report dated Jan. 14, 2014 which was issued in connection with GB Patent Application No. 1313779.9 which was filed on Aug. 1, 2013.
Unofficial English Translation of Chinese Office Action issued in connection with corresponding CN Application No. 201480043514.3 dated Mar. 17, 2017.

* cited by examiner

EROSION RESISTANT AERODYNAMIC FAIRING

BACKGROUND

Embodiments of the present invention relate to an erosion resistant aerodynamic fairing and more particularly to an erosion resistant aerodynamic fairing for a rotor blade. Embodiments of the present invention are described herein by way of a practical example as an erosion resistant aerodynamic fairing for a wind turbine blade. However, it is readily applicable to other types of erosion-exposed surfaces, such as helicopter rotor blades, or fan blades.

Large three-bladed wind turbine blades typically rotate with tip speeds in the range of 75 to 100 meters per second. For some two-bladed turbines, the blades can rotate with a tip speed as high as 130 meters per second. This causes very severe erosion conditions at the tip of the blade as well as along the outer ⅓ of the leading edge, leading to blade damage in these areas. Although wind blades are typically expected to last for 20 years, this is often not the case due to the damage caused by erosion to the leading edge necessitating blade repair. However, repair of the leading edge is not easy since it is typically carried out with the blade still erected on the turbine. This also has significant cost and safety implications, particularly if the wind turbine is located offshore.

In order to reduce the damage caused by erosion, it is known to protect the leading edge of a wind turbine blade using a specialist paint coating. Such paints, for example "BladeRep LEP 9" available from Mankiewicz Gebr. & Co. of Hamburg Germany, have heavily filled and special formulations to give increased protection to the leading edge of a wind turbine blade. However, although erosion resistance is increased in the area to which the paint is applied, the protection provided by a specialist paint coating will diminish over time and will not last for the expected blade design life of 20 years without maintenance.

A further known example of an erosion protection measure for wind turbine blades is the use of metallic leading edges. However, these lead to an increase in the mass of the blade tip and, thus, increase the loads on the rest of the blade and the turbine. Metallic leading edges also increase the local stiffness of the blade, which can worsen aerodynamic performance, and can complicate the lightning protection systems required for the blade due to their conductive nature.

It is also known to apply a protective layer of thermoplastic film over the leading edge of a wind turbine blade. An example of this can be seen in FIG. 1, which shows the leading edge 118 of a fairing 110 for a wind turbine blade to which a protective layer of thermoplastic film 120 is fixed. Typically, the fairing 110 is formed from a composite laminate body 112 and the thermoplastic film 120 is post applied to the leading edge 118 as a thin (150 mm wide) tape with a layer of pressure sensitive adhesive 119. Such films offer good erosion resistance but are difficult to apply. Further, the quality of the bond between the thermoplastic film 120 and the laminate body 112 is dependent on the surface of the fairing 110 being free from grease and dust etc.

Alternatively, it is known to fix the thermoplastic film to the blade during the moulding of the fairing, as disclosed in International Publication No. WO2006/006593. In this method, layers of reinforcing fibre are placed on top of a film laid out against the mould surface, following which resin is applied to join the layers. Although this method provides an improved bond relative to post-applied films, it is difficult to control the quality of the interface between film and fairing and the quality of the substrate immediately beneath the film using this method.

A further known example of an erosion resistant fairing can be found in International Publication No. WO2010/117262. This fairing comprises a protective cover formed of a thermoplastic layer, a glass fibre mat and a cured epoxy resin layer by which the protective cover is attached to a composite body formed from fibre reinforced blade shells. The composite body and the protective cover are formed separately, and the protective cover is set in a recess in the composite body before the two components are fixed together using a layer of heat curable epoxy resin. However, this approach requires precise tolerance control of the parts to ensure that they fit together correctly and, as with the application of a thermoplastic film, the quality of the bond between the cover and the composite body is not easily controlled since it is dependent on the cleanliness of the attached surfaces.

SUMMARY OF THE INVENTION

According to a first aspect of the present invention, there is provided an erosion resistant aerodynamic fairing for a rotor blade, the fairing comprising a fairing body formed from at least one reinforcing fibre layer set in a cured resin, and an erosion resistant pre-form fixed to an outer surface of the fairing body, wherein the erosion resistant pre-form comprises a thermoplastic film outer layer fused to a fibre substrate, and wherein the fibre substrate of the erosion resistant pre-form is impregnated with the cured resin of the fairing body which fixes the preform to the fairing body.

By using a pre-form formed of a thermoplastic film fused directly to a fibre substrate and fixing the erosion resistant layer with the resin of the fairing body enables much better control of both the quality of the interface between the fairing and the film and the quality of the substrate immediately beneath the film, which has been found to have a significant effect on the long term erosion performance of the fairing The thermoplastic film may comprise any suitable thermoplastic material, for example polyurethane. In an embodiment, the thermoplastic film comprises an aliphatic polyurethane. These types of polyurethane have been found to possess particularly good erosion resistant properties, hydrolytic stability and low temperature flexibility, making them well suited for use in aerodynamic fairings. The surface energy of these materials also allows them to bond well with epoxy resins, further enhancing the fixation of the erosion resistant layer to the composite body. More particularly the aliphatic polyurethane comprises long and short chain polyether, polyester, or caprolactone glycols, or a combination thereof from the composite body in the same manner as the thermoplastic film 120 shown in FIG. 1.

The film may have smooth inner and outer surfaces. In an embodiment, the film has a textured outer surface. By having a textured outer surface, i.e. the surface which comes into contact with the mould during manufacture, air can easily escape when the pre-form is placed in the mould and a vacuum applied. This results in a further improvement to the quality of the final erosion resistant fairing.

The surface texture may be any suitable arrangement. In an embodiment, the surface texture comprises a plurality of protrusions which may comprise a plurality of square and/or pyramid shaped protrusions more particularly arranged in a regular array. This has been found to result in a particularly high quality fairing.

In an embodiment, the erosion resistant layer is set in and fixed to the outer surface of the fairing body such that the edges of the erosion resistant layer are flush with the fairing body. With this arrangement, the erosion resistant layer has no free edges, reducing the risk of the thermoplastic film peeling off from its edges and avoiding aerodynamic steps across the outer surface of the fairing which may otherwise worsen aerodynamic performance.

The erosion resistant layer may be applied to the entire length of a rotor blade. In an embodiment, the erosion resistant layer is substantially confined to the outermost third of the blade length. In such an arrangement, the blade may still include one or more patches of erosion resistant layer inward of the outermost third of the blade length, for example to protect the blade in areas of locally high erosion.

The erosion resistant layer may be fixed to the composite body over the entire profile of a rotor blade, or over a particular part of the rotor blade, such as the trailing edge. More particularly, the erosion resistant layer is fixed to the fairing body at the leading edge of the rotor blade.

According to a second aspect of the present invention, there is provided a method of manufacturing an erosion resistant aerodynamic fairing for a rotor blade comprising fusing a thermoplastic film to a fibre substrate to form an erosion resistant pre-form, placing the erosion resistant pre-form into a mould such that the thermoplastic film is placed directly against the mould surface, placing at least one reinforcing fibre layer into the mould and on top of the pre-form, impregnating the reinforcing fibre layer with a curable resin to form an uncured composite body, and curing the resin to form a fairing body from the uncured composite body such that the resin impregnates the fibre substrate and forms a continuous resin matrix between the pre-form and the reinforcing fibre layer to fix the pre-form to the fairing body.

This method enjoys the same advantages mentioned above in respect of the first aspect of the present invention.

The thermoplastic film may be extruded or film cast directly onto the fibre substrate. Alternatively, the step of fusing the thermoplastic film to the fibre substrate comprises heating the thermoplastic film and the fibre substrate at a temperature of at least 60° C. and pressing them together. This ensures that the thermoplastic film is strongly fused to the fibre substrate. More particularly, the film and substrate are fused together at a temperature of between 60° C. and 150° C. This ensures that the thermoplastic film is strongly fused to the fibre substrate and also avoids the loss of shape of the thermoplastic film which may occur at higher temperatures, thus providing a high quality surface finish.

The pre-from and the fairing body may be joined together without any significant heating of the thermoplastic film. In an embodiment, the thermoplastic film is heated to above its Vicat softening temperature before the resin reaches its minimum viscosity.

The step of impregnating the reinforcing fibre layer may include impregnating the reinforcing fibre layer with the curable resin after placing the reinforcing fibre layer into the mould. For example, the reinforcing fibre layer may be infused with the resin under a vacuum. More particularly, the step of impregnating the reinforcing fibre layer includes pre-impregnating the reinforcing fibre layer with the curable resin before placing the reinforcing fibre layer into the mould. This allows a highly controlled resin content and improved process reliability and repeatability, reduced process times and allows the use of higher performance resins to improve the mechanical performance of the fairing.

The fibre substrate may be inserted into the mould without any resin having been applied to it beforehand. Using this approach, as the stack of the pre-form and the uncured composite body is cured, the resin migrates from the uncured composite to impregnate the fibre substrate before curing to fix the erosion resistant layer to the fairing body. Alternatively, the fibre substrate may be pre-impregnated with the curable resin before placing the pre-form into the mould.

During the curing step, the resin may impregnate the fibre substrate only partially. This will still result in a firm bond between the erosion resistant layer and the fairing body. In an embodiment, the resin fully impregnates the fibre substrate during the curing step. This enables the resin to provide an additional chemical connection to the thermoplastic film to improve the fixation of the thermoplastic film to the fairing.

The erosion resistant layer and the uncured composite may be cured together, or "co-cured", at any suitable temperature. More particularly, the curing step comprises heating the curable resin to a temperature of from 60° C. to 130° C. This allows a firm fixation between the two layers but prevents the distortion of the thermoplastic film and poor surface finish which may result from higher temperatures.

In an embodiment, the method further comprises the step of applying a surface texture to the outer surface of the thermoplastic film prior to the step of placing the pre-form in the mould, more particularly during the step of fusing the thermoplastic film to the fibre substrate to form the pre-form. As noted above in respect of the first aspect of the invention, the surface texture allows air to more easily escape when the pre-form is placed in the mould and a vacuum applied. This results in a further improvement to the quality of the final erosion resistant fairing. The surface texture may be any suitable arrangement. In an embodiment, the surface texture comprises a plurality of protrusions which may comprise a plurality of square and/or pyramid shaped protrusions may be arranged in a regular array. This has been found to result in a particularly high quality fairing.

BRIEF DESCRIPTION OF THE DRAWINGS

An example of the present invention will now be described with reference to the following drawings in which.

DETAILED DESCRIPTION

Figure 1:
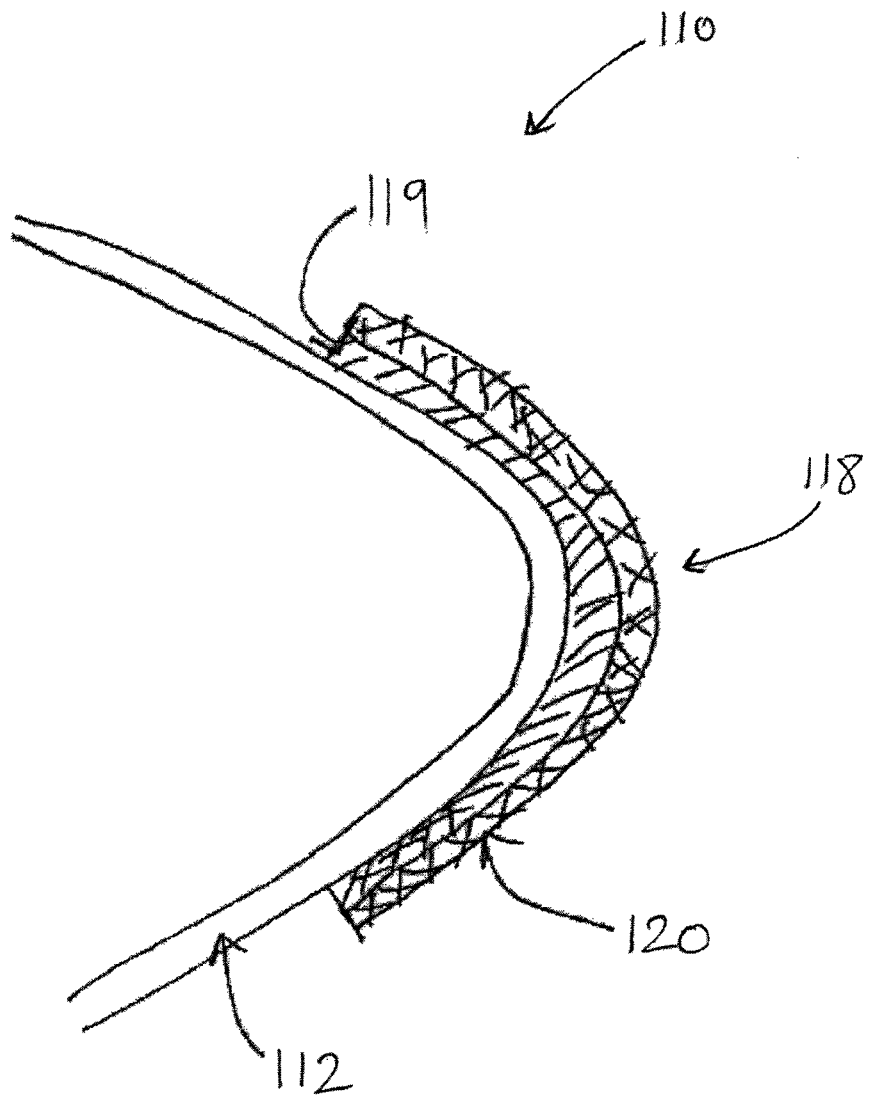
FIG. 1 is a cross-sectional view of the leading edge of a conventional erosion resistant aerodynamic fairing for a wind turbine blade.
Figure 2:
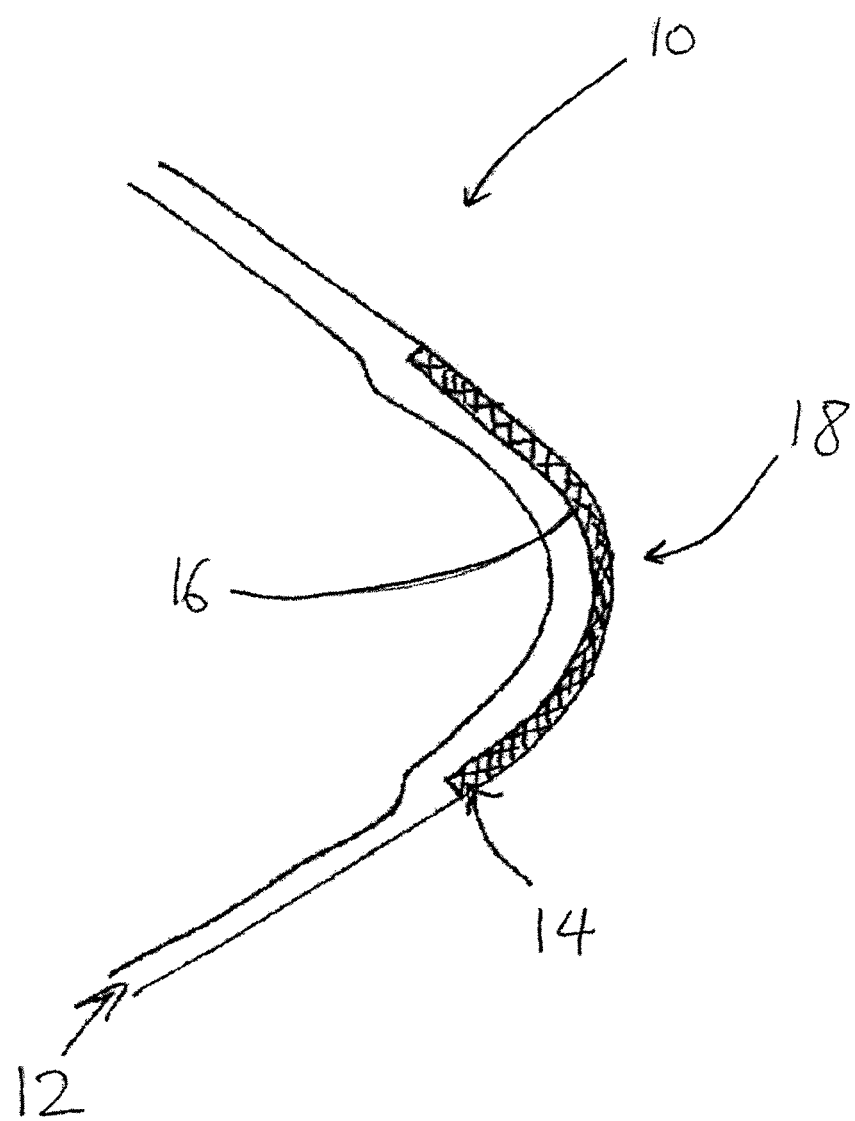
FIG. 2 is a cross-sectional view of the leading edge of an erosion resistant aerodynamic fairing for a wind turbine blade according to embodiments of the present invention.

Referring to FIG. 2, an erosion resistant aerodynamic fairing 10 is shown. The erosion resistant aerodynamic fairing 10 is formed from a fairing body 12 and an erosion resistant pre-form 14 fixed to an outer surface 16 of the fairing body 12 at the leading edge 18 of the fairing 10.

Figure 3:
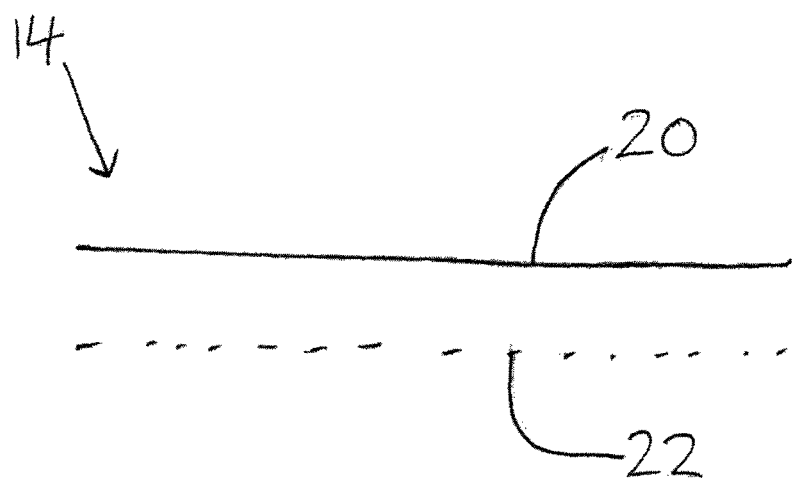
FIGS. 3, 4, 5 and 6 are cross-sectional schematic views of the fairing of FIG. 2 at various stages of manufacture.
Figure 4:
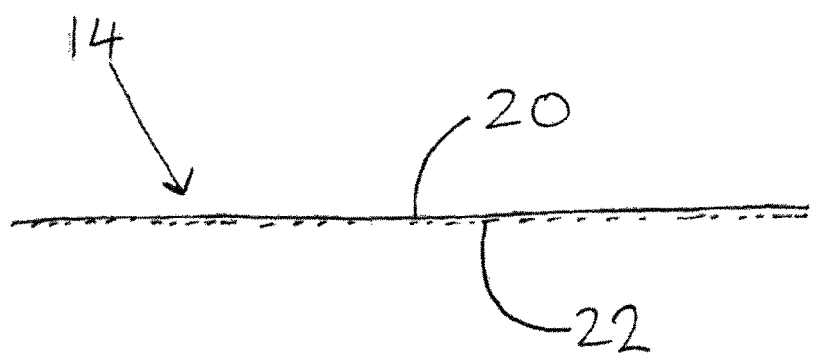

Referring to FIGS. 3 and 4, the erosion resistant pre-form 14 comprises a thermoplastic film 20 outer layer fused to a fibre substrate 22. The thermoplastic film 20 is formed from an aliphatic polyurethane, which is approximately 600 microns thick and may be produced using long and short chain polyether, polyester, or caprolactone glycols. The polyether types have better hydrolytic stability and low-temperature flexibility, the polyester types have better mechanical properties, and caprolactones offer a good compromise between the properties of the polyether and polyester types. In this example, caprolactone gycols are used. This results in film 20 having a Shore A hardness of approximately 75 to 95, an elongation of at least 300% and a surface energy in the region of 40 to 44 mN/m. The fibre substrate 22 is a glass fibre fabric pre-form which is multi-axial and has a weight of approximately 150 g/m$^2$ The thermoplastic film 20 and the fibre substrate 22 are heated to a temperature of 60 to 150° C. and pressed together under an additional pressure of approximately 1 bar for approximately 60 seconds. This causes the film 20 and substrate 22 to fuse together, forming the erosion resistant pre-form 14, as shown in FIG. 3. The fusing process creates a very strong connection between the film 20 and the substrate 22. In addition, at this stage the erosion resistant pre-form 14 is very flexible and can easily be placed into a mould for a complex shape, such as for a wind turbine blade leading edge.

Figure 5:
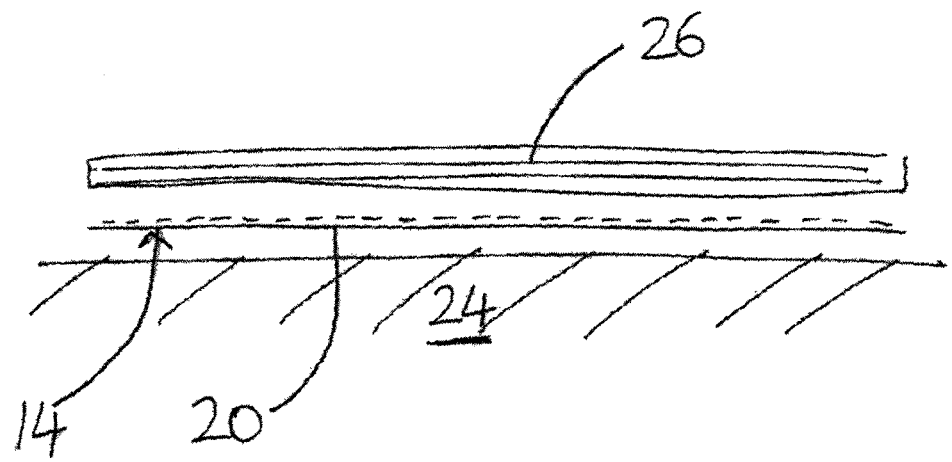
Figure 6:
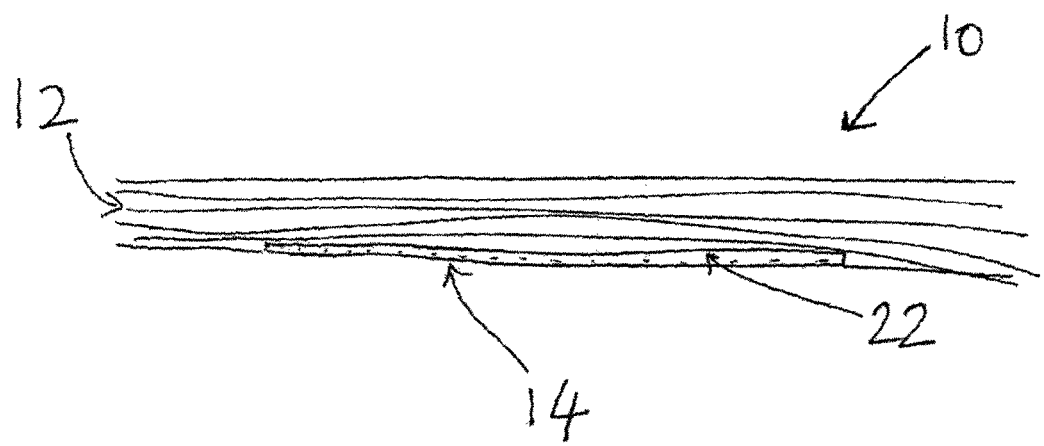

Referring to FIGS. 5 and 6, the manufacture of the fairing 10 is shown. The erosion resistant pre-form 14 is placed into a mould 24 with the thermoplastic film 20 against the surface of the mould 24. Following this, layers of pre-preg 26, which are formed from glass or carbon fibres pre-impregnated with an epoxy resin, are placed onto the erosion resistant pre-form 14 to form the typical composite laminate required for a fairing, as illustrated schematically in FIG. 5.

The erosion resistant pre-form 14 and the layers of pre-preg 26 are then co-cured under a vacuum and at a temperature of between 60 to 130° C. for approximately 12 hours in the same manner as for normal pre-preg processing. As the stack of the erosion resistant layer 14 and the layers of pre-preg 26 is cured, resin from the pre-preg 26 migrates into and impregnates the fibre substrate 22. The resin then fully cures to form the fairing body 12 from the pre-preg 26 and to fix the erosion resistant pre-form 14 to the composite body 12. In doing so, the resin forms a continuous matrix through the composite body 12 and the erosion resistant pre-form 14 to firmly bond the two layers together. The resin also forms a chemical connection with the thermoplastic film 20, further strengthening the fixation of the erosion resistant pre-form 14 to the composite body 12. Thus, the resulting interface between the fairing body 12 and the erosion resistant pre-form 14 is well controlled and the fairing body 12 and fibre substrate 22 provide a very high quality substrate directly beneath the thermoplastic film 20 to improve long term erosion performance.

Since the fairing body 12 and the erosion resistant pre-from 14 are co-cured, the fairing body 12 is shaped around the erosion resistant pre-form 14 so that the edges of the erosion resistant pre-form 14 lie flush with the fairing body 12. This gives the resulting fairing 10 a smooth outer profile, as shown in FIG. 6. This smooth profile reduces the impact of the erosion resistant pre-form 14 on aerodynamic performance and avoids presenting free edges which could otherwise lead to the erosion resistant pre-form 14 being more easily removed from the fairing body 12.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An erosion resistant aerodynamic fairing for a rotor blade, the fairing comprising:
    a fairing body formed from at least one reinforcing fibre layer set in a cured resin; and
    an erosion resistant pre-form fixed to an outer surface of the fairing body,
    wherein the erosion resistant pre-form comprises a thermoplastic film outer layer fused to a fibre substrate, and
    wherein the fibre substrate of the erosion resistant pre-form is impregnated with the cured resin of the fairing body which fixes at the preform to the fairing body.

2. The erosion resistant aerodynamic fairing according to claim 1, wherein the thermoplastic film comprises an aliphatic polyurethane.

3. The erosion resistant aerodynamic fairing according to claim 1, wherein the erosion resistant layer is fixed to the outer surface of the fairing body such that the edges of the erosion resistant layer are flush with the fairing body.

4. A rotor blade comprising an erosion resistant aerodynamic fairing according to claim 1.

5. The rotor blade according to claim 4, wherein the erosion resistant aerodynamic fairing is substantially confined to the outermost third of the blade length.

6. The rotor blade according to claim 4, wherein the erosion resistant aerodynamic fairing is fixed to the leading edge of the rotor blade.

7. A wind turbine comprising an erosion resistant aerodynamic fairing according to claim 1.

8. A method of manufacturing an erosion resistant aerodynamic fairing for a rotor blade, comprising:
    fusing a thermoplastic film to a fibre substrate to form an erosion resistant pre-form;
    placing the erosion resistant pre-form into a mould such that the film is placed directly against the mould surface;
    placing at least one reinforcing fibre layer into the mould and on top of the pre-form;
    impregnating the reinforcing fibre layer with a curable resin to form an uncured composite body; and
    curing the resin to form a fairing body from the uncured composite body, such that the resin impregnates the fibre substrate and forms a continuous resin matrix between the pre-form and the reinforcing fibre layer to fix the pre-form to the fairing body.

9. The method according to claim 8, wherein the step of fusing the thermoplastic film to the fibre substrate comprises heating the thermoplastic film and the fibre substrate at a temperature of at least 60° C., and pressing them together.

10. The method according to claim 9, wherein the temperature is between 60° C. and 150° C.

11. The method according to claim 8, wherein the step of fusing the thermoplastic film to the fibre substrate comprises extruding or film casting the thermoplastic film directly onto the fibre substrate.

12. The method according to claim 8, wherein the thermoplastic film is heated to above its Vicat softening temperature before the resin reaches its minimum viscosity.

13. The method according to claim 8, wherein the thermoplastic film comprises an aliphatic polyurethane.

14. The method according to claim 8, wherein the step of impregnating the reinforcing fibre layer comprises pre-impregnating the reinforcing fibre layer with the curable resin before placing the reinforcing fibre layer into the mould.

15. The method according to claim 8, further comprising pre-impregnating the fibre substrate with the curable resin before placing the pre-form into the mould.

16. The method according to claim 8, wherein the resin fully impregnates the fibre substrate during the curing step.

17. The method according to claim 8, wherein the curing step comprises heating the curable resin to a temperature of from 90° C. to 130° C.

18. The method according claim 8, further comprising the step of applying a surface texture to the outer surface of the thermoplastic film prior to the step of placing the pre-form in the mould.

19. The method according to claim 18, wherein the textured outer surface comprises a plurality of protrusions.

20. The method according to claim 19, wherein the plurality of protrusions comprises a plurality of square and/or pyramid shaped protrusions.

21. The method according to claim 18, wherein the step of applying a surface texture to the outer surface of the thermoplastic film takes place during the step of fusing the thermoplastic film to the fibre substrate to form the pre-form.

* * * * *